United States Patent [19]

Lindsay

[11] Patent Number: 4,638,584
[45] Date of Patent: Jan. 27, 1987

[54] LUMINESCENT FISHING LURES

[76] Inventor: William R. Lindsay, Rte. 10, Box 610, Arkanas Rd., West Monroe, La. 71291

[21] Appl. No.: 731,548

[22] Filed: May 7, 1985

[51] Int. Cl.⁴ .......................................... A01K 85/01
[52] U.S. Cl. ................... 43/17.6; 43/42.31; 43/42.33
[58] Field of Search ............... 43/17.6, 17.5, 42.06, 43/42.33, 42.31

[56] References Cited

U.S. PATENT DOCUMENTS

| | | | |
|---|---|---|---|
| 3,708,903 | 1/1973 | Bercz | 43/17.6 |
| 3,762,092 | 10/1973 | Bercz | 43/17.6 |
| 3,861,072 | 1/1975 | Holcombe | 43/17.6 |
| 3,863,380 | 2/1975 | Purlia | 43/17.6 |
| 3,895,455 | 7/1975 | Johnston | 43/17.6 |
| 3,918,190 | 11/1975 | Hornbeck | 43/17.6 |
| 3,921,328 | 11/1975 | Holcombe | 43/17.6 |
| 3,936,970 | 2/1976 | Hodges | 43/17.6 |

FOREIGN PATENT DOCUMENTS 2232268  1/1975  France ................... 43/17.6

Primary Examiner—Gene P. Crosby
Attorney, Agent, or Firm—John M. Harrison

[57] ABSTRACT

Luminescent fishing lures of both the rigid and flexible body type, which include in a first rigid body embodiment, placing a chemiluminescent first component material in a body cavity formed in the lure and inserting a second component activator or material through an opening in the body to produce an illuminating glow. Alternatively, the first component can be located in a flexible container, the second component also provided in the container inside a frangible vial and the components mixed by crushing the vial and then introducing them as a luminescent mixture into the body cavity. In a second, flexible body embodiment, a mixing capsule is inserted in the body of a flexible lure such as a plastic worm or grub, the mixing capsule having a chemiluminescent or first component compartment and a separate activator or second component compartment, separated by at least one frangible membrane. When the lure is used, the fragible membrane is ruptured by finger pressure and the first component material is mixed with the second component material, or activator, to produce the desired luminescent glow. In a most preferred embodiment of the invention, both the rigid body lure and the flexible body lure are provided with alternating opaque and transparent patterns to facilitate chemical glow from selected transparent areas on the lures.

4 Claims, 9 Drawing Figures

LUMINESCENT FISHING LURES

BACKGROUND OF THE INVENTION

1. Field of the Invention

It is known that light attracts fish and that light is particularly attractive to fish when the light source is immersed in the water with the fish. For example, a chemiluminescent wand has been found to be an ideal source of light for attacting fish when immersed near a baited hook. The term "chemiluminescent" refers to light emission by chemical reaction in various colors, which depend upon the choice of chemiluminescent components.

This invention relates to luminescent fishing lures and more particularly, to fishing lures of both the rigid body and flexible body type for attracting both fresh and salt water fish, wherein a first component chemiluminescent material is selectively mixed with a second component or activator to produce a chemical glow from the interior of the lure body. In the case of rigid body lures, in one embodiment of the invention the chemiluminescent material is initially inserted in the body cavity of the lure through an access opening and when the lure is to be used, an activator or second chemiluminescent material is inserted in the body cavity to produce the desired glow. Alternatively, the activator or second chemiluminescent component can be premixed with the first chemiluminescent material in a specially designed container and then inserted in the lure. In a most preferred embodiment, the lure body is characterized by alternating opaque and transparent patterns such as simulated scales, to produce the desired chemical glow through the transparent surface areas only.

In yet another embodiment of the invention, flexible body lures are provided with a chemical glow by inserting a mixing capsule or cylinder in the lure body, which mixing capsule is characterized by separate first and second chemiluminescent component compartments which are isolated by a frangible membrane or membranes. When it is desired to use the flexible body lure, the capsule membrane or membranes are ruptured to permit mixing of the chemiluminescent material components and produce the desired illumination. As in the case of the rigid body lures, the flexible body lures can be provided with alternating opaque and transparent patterns to produce chemical glow from the transparent patterns only. In yet another preferred embodiment of the invention, metal, plastic, or glass balls are inserted in the mixing capsule, cylinder or body cavity of the lures to help mix the chemiluminescent components and provide an attractive rattling effect as the lures are retrieved.

2. Description of the Prior Art

The concept of creating a chemiluminescent glow in fishing lures to attract fish is known in the art. U.S. Pat. No. 3,708,903, dated Jan. 9, 1973, to Bercz et al., discloses a "Self-Illuminating Chemiluminescent Fishing Lure". This lure consist of a container provided with a cavity which is adapted to receive a chemiluminescent material and further includes a gaspermeable member which is impervious to the chemiluminescent material, for reducing gas diffusion pressure build-up within the cavity. The gas-permeable member may include a material which is softer than the adjacent members of the lure and may be held in place by a snap-action mechanism or it may be clamped in place. The member which communicates with the exterior of the lure permits the escape of gases common to that of the normal atmosphere, while preventing pollution of environmental waters by escape of the chemiluminescent material. At least a portion of the container is adapted to include a transparent material, with preferred embodiments including an optical brightener. U.S. Pat. No. 3,762,092, dated Oct. 2, 1973, also to Bercz et al., discloses another fishing lure containing a chemiluminescent substance. This patent discloses refillable containers adapted for the visible display of at least dual colored light generated from chemiluminescent substances acting in cooperation with luminescent inserts, compositions or coatings associated with at least one wall of the container. Some containers include refill openings covered by removable closures, while other containers are formed by snapping together members forming their walls. Other embodiments have closures hinged to the container body. The containers are adaptable for use as substantially spill-proof display costume jewelry and as substantially pollution-free chemiluminescent, light-generating fish lures. A "Method for Illuminating Organic Fishing Baits" is disclosed in U.S. Pat. No. 3,918,190, dated Nov. 11, 1975, to Eugene K. Hornbeck. According to this patent, the internal tracts of organic fishing baits such as angle worms, night crawlers, crawfish, and the like are injected with a liquid chemiluminescent light source for the purpose of enhancing attraction of game fish to the bait. The chemiluminescent light source is of extended, continuous time duration and is chemically generated by the slow interaction within the fishing bait of at least two normally stable chemical components. The dispensing device for the chemiluminescent material or materials includes a manually resiliently, compressible container which carries a sharp, needle-like snout for injecting the chemiluminescent component or components into the organic bait. U.S. Pat. No. 3,921,328, dated Nov. 25, 1975, to Gordon B. Holcombe, discloses a "Luminescent Fishing Lure". This patent details an illuminated fishing lure for attracting fish, squid and other acquatic life, the lure being formed of a brilliant chemiluminescent wand having a transparent, unweighted sheath with a curved tongue for causing the lure to submerge when it is pulled through the water. The wand contains a first chemical in an inner frangible tube and a second chemical located in an outer flexible casing encompassing the inner tube. When the outer casing is deformed, the inner tube is fractured, causing the chemicals to mix and generate a luminescence. U.S. Pat. No. 3,935,659, dated Feb. 3, 1976, to James B. McCallum, discloses a "Phosphorescent Fishing Lure". This lure includes a phosphorescent material applied thereto, which after irridation, will itself radiate light. A first embodiment of the invention illustrates a fishing spoon which is adapted to rotate in the water and is provided with a phosphorescent coating applied to one section of the lure, such that as the lure is trolled through the water it appears to flash on and off. A second embodiment of the invention illustrates an artificial plastic worm which has embedded in its translucent body a strip of phosphorescent material. A "Fishing Lure and Method of Fishing" is disclosed in U.S. Pat. No. 3,936,970, dated Feb. 10, 1976, to John A. Hodges. The patent details a lure which emits light having a peak wave length in the range from about 4500A to about 5000A. The lure includes a light source such as a luminescent material comprising a phosphor such as zinc sulfide, an extender such as magnesium carbonate and a suspending agent such as silica and zinc palmitate, as well as a carrier for the luminescent material, such as a transparent or translucent plastic. The invention also relates to a method of fishing which includes displaying the lure in the presence of a means for catching fish.

It is an object of this invention to provide new and improved luminescent fishing lures which are characterized by both rigid and flexible bodies and which include luminescence emanating from selected patterned areas on the lure bodies.

Another object of the invention is to provide a luminescent rigid body lure which is characterized by an access opening and a hollow interior containing a combination of chemiluminescent materials or a chemiluminescent material and an activator and provided with appropriate surface markings consisting of opaque and transparent pattern areas for producing a chemical glow which is visible through the transparent areas only.

Still another object of this invention is to provide a luminescent fishing lure having a flexible body, which flexible body includes a selected transparent pattern and a mixing capsule containing chemiluminescent material components isolated in separate compartments, whereby crushing of the capsule or frangible connecting membranes allows the chemiluminescent component materials to mix and produce a chemical glow through the pattern.

Yet another object of this invention is to provide chemiluminescent fishing lures of both the rigid and flexible plastic body type, which lures are characterized by separate chemicals which, when combined, create a luminescent solution located in the interior of the body, with alternating opaque and transparent patterns provided in the body to produce a chemical glow of selected color through the transparent areas only.

A still further object of the invention is to provide a new and improved container for creating and dispensing a chemiluminescent mixture into the hollow cavities or interiors of plastic fishing lures to facilitate chemical glow in the lures.

SUMMARY OF THE INVENTION

These and other objects of the invention are provided in luminescent fishing lures of both the rigid and flexible body design, which lures are chracterized by a luminescent mixture located in the interior of the lure body, with alternating patterns of transparent and opaque body surfaces, whereby a chemical glow is produced through the transparent surface areas and patterns only. In one embodiment, one or more mixing capsules are inserted in a flexible body lure and contain a chemiluminescent material and an activator. Alternatively, separate chemiluminescent component materials are placed in separate frangible compartments for mixing when the capsule is crushed, to produce the chemical glow. In another embodiment, the chemiluminescent material and activator or separate chemiluminescent materials are provided in a mixing container and are separated by a frangible capsule located in the mixing container, such that when the capsule is crushed, the materials mix and the luminescent mixture is poured into the hollow interior of a rigid body lure to produce the desired glow. Alternatively, either component can be initially placed in a rigid body lure and the other component added through an access opening to produce the desired glow.

The invention will be better understood by reference to the accompanying drawing, wherein.

DESCRIPTION OF THE PREFERRED EMBODIMENTS

Figure 1:
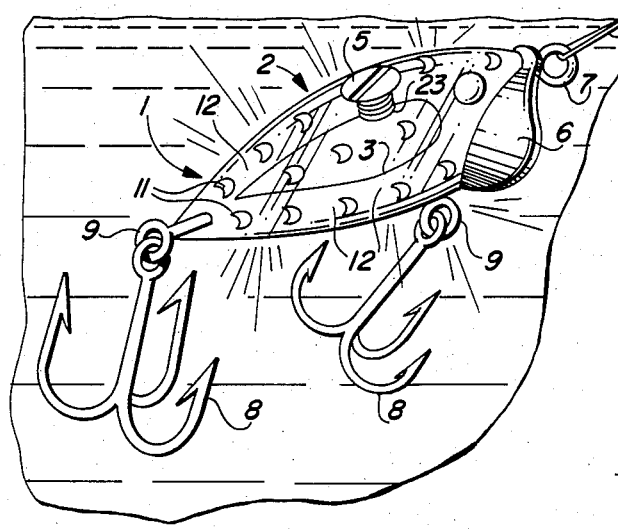
FIG. 1 is a perspective view of a rigid body lure adapted for chemiluminescent illumination according to this invention.
Figure 2A:
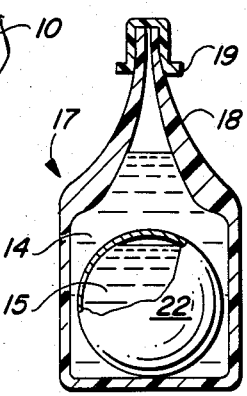
FIG. 2A is a sectional view of a specially designed container for inserting chemiluminescent material into the lure illustrated in FIG. 1.
Figures 2B, 2C:
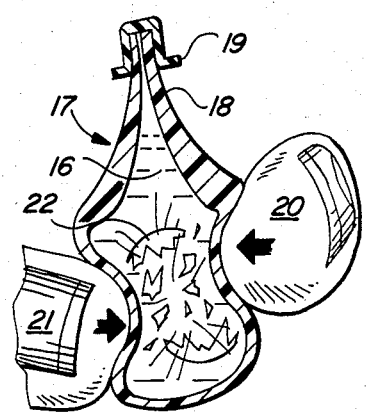
FIG. 2B is a sectional view of the container illustrated in FIG. 2A, more particularly illustrating crushing of a mixing component vial.
FIG. 2C is a sectional view of the rigid body lure and container, illustrating filling of the lure with a chemiluminescent mixture.
Figure 6:
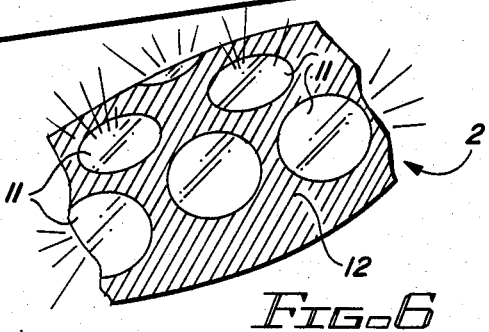
FIG. 6 is a sectional view of a lure body illustrating a pattern for light emission according to the invention.

Referring now to FIGS. 1 and 2A–2C of the drawing in a first preferred embodiment, the luminescent fishing lure of this invention is characterized by a rigid body lure, generally illustrated by reference numeral 1. The rigid body lure 1 is characterized by a rigid body 2 which is shaped from a plastic material such as polycarbonate, polethylene, polypropylene or like materials known to those skilled in the art. The rigid body 2 is configured to resemble a fish and may be patterned after substantially any bait fish which is used to attract game fish. A body cavity 3 is formed inside the rigid body 2 and an access opening 4, more particularly illustrated in FIG. 2C, is provided with internal threads 13. The internal threads 13 are designated to threadably receive the external threads 23 of an access screw 5, in order to removably seal the body cavity 3. A lip 6 is provided on the rigid body 2 in order to impart a desired wobble or swimming motion to the rigid body lure 1 when a line 10 is tied to the line eye 7 and the rigid body lure 1 is retrieved. Hooks 8 are secured to the rigid body 2 by means of hook eyes 9 and served to secure a fish which strikes the rigid body lure 1. In a most preferred embodiment of the invention, and referring to FIGS. 1 and 6, the rigid body 2 is constructed to feature a transparent pattern 11, which visually extends through the rigid body 2 to the body cavity 3 and simulates scales or another desired pattern in the rigid body 2. The remaining exterior of the rigid body 2 is characterized by an opaque surface 12, which is designed to retard or prevent the transmission of chemiluminescent light from the body cavity 3 externally of the rigid body lure 1. Referring now to FIGS. 2A and 2B of the drawing in another most preferred embodiment of the invention, a flexible container 17 is used to contain a first component 14 and an activator vial 22, containing a second component 15, which first component 14 and second component 15, when mixed together, produce a luminescent mixture 16, as illustrated in FIGS. 2B and 2C. As illustrated in FIG. 2B, when it is desired to introduce a quantity of the luminescent mixture 16 into the body cavity 3 of the rigid body lure 1, the flexible container 17 is squeezed by the finger 20 and thumb 21, until the activator vial 22 is crushed and the second component 15 is mixed with the first component 14 to form the luminescent mixture 16. The container cap 19 is then removed from the flexible container spout 18 and the luminescent mixture 16 is introduced into the body cavity 3 by removing the access screw 5 and inserting the container spout 18 into the access opening 4, as illustrated in FIG. 2C. It will be further appreciated by those skilled in the art that instead of mixing the first component 14 and the second component 15 together in the flexible container 17, either the first component 14 or the second component 15 can be initially introduced into the body cavity 3 by using the flexible container 17 or any alternative container having a container spout 18. When it is desired to use the rigid body lure 1, an additional quantity of second component 15 can be supplied from a second flexible container 17 or other container, to mix with the first component 14 in the body cavity 3 and produce the luminescent mixture 16 illustrated in FIG. 2C.

Figure 3:
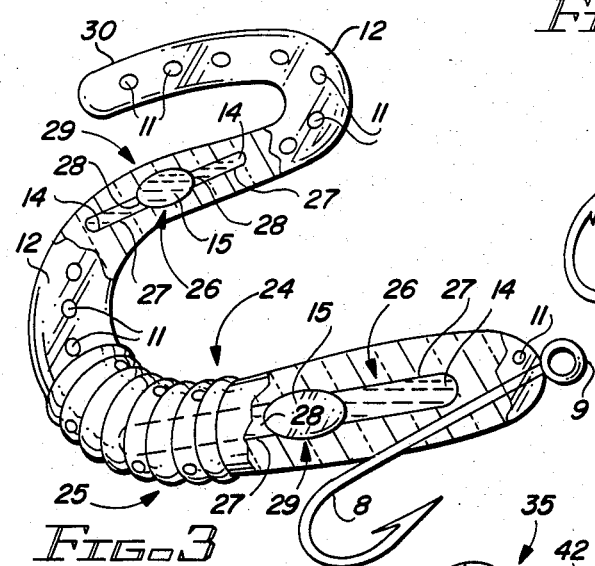
FIG. 3 is a perspective view, partially in section, of a flexible worm lure according to this invention.
Figure 5:
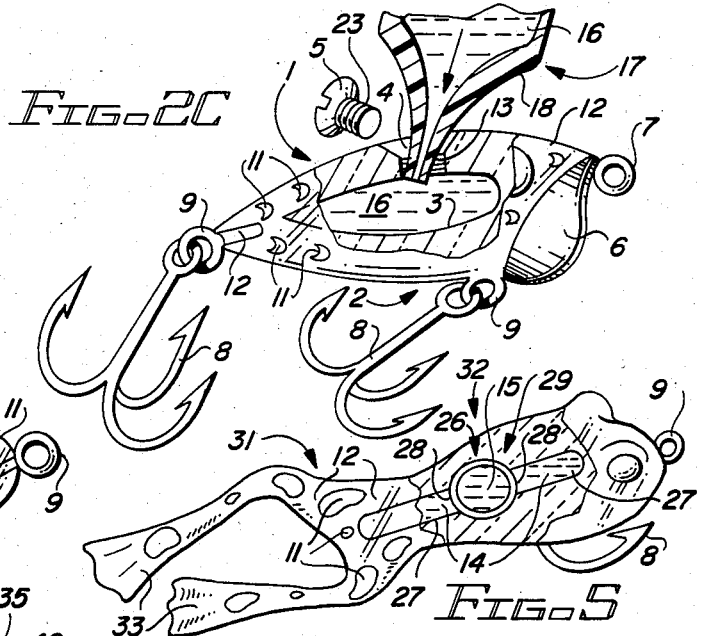
FIG. 5 is a perspective view, partially in section, of a flexible frog lure according to this invention.

Referring now to FIG. 3 of the drawing in another preferred embodiment, a flexible worm lure is generally illustrated by reference numeral 24. The flexible worm lure 24 is characterized by a resilient worm body 25, which is terminated at one end by a worm tail 30 and is formulated of a plastic material well known to those skilled in the art. A pair of mixing capsules 26 are inserted in spaced relationship in the worm body 25 and each mixing capsule 2 is characterized by a first component compartment 27 at each end, joined by a second component compartment 29. The first component compartments 27 are isolated from the second component compartment 29 by means of frangible membranes 28. The first component 14 is included in the first component compartments 27, while a quantity of second component 15 is provided in the second component compartment 29. Accordingly, when it is desired to use the flexible worm lure 24 the mixing capsule 26 is crushed with the finger 20 and thumb 21 as illustrated in FIG. 2B with respect to the flexible container 17. This act ruptures the frangible membranes 28 and allows the first component 14 and the second component 15 to mix and produce a luminescent mixture 16, in the same manner as illustrated in FIG. 2C, in order to effect a chemical glow through the transparent pattern 11, provided in the worm body 25. Similarly, and referring now to FIG. 5 of the drawing, when the mixing capsule 26 is crushed in the flexible frog lure 31 by exerting pressure on the frog body 32, a luminescent mixture 16, as illustrated in FIG. 2C, is produced by mixing the first component 14, located in the first component compartment 27 and the second component 15, located in the second component compartment 29. A chemiluminescent glow is therefore produced and can be seen through the transparent pattern 11, provided in the frog body 32 and the upper portions of the frog legs 33.

Figure 4:
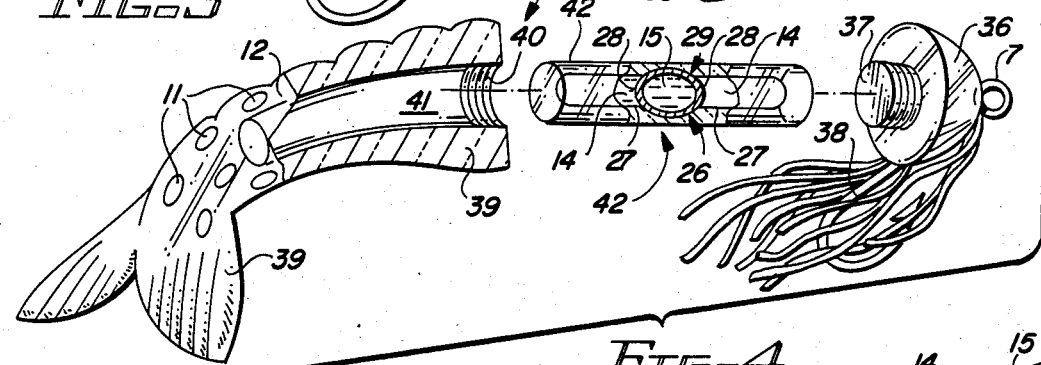
FIG. 4 is a sectional, exploded view of a flexible shrimp lure according to this invention.

Referring now to FIG. 4 of the drawing in yet another preferred embodiment of the invention, a shrimp lure 35 is illustrated, with a removable rigid head 36, provided with an extending threaded nipple 36 and attractive streamers 38. A flexible shrimp tail 39 is designed with internal threads 40 for receiving the threaded nipple 37 and removably securing the rigid head 36 to the flexible shrimp tail 39. The flexible shrimp tail 39 is further provided with a tail cavity 41, for receiving a mixing cylinder 42, which is formed of a material such as an acrylic plastic and contains a mixing capsule 26, as in the case of the flexible worm lure 24, illustrated in FIG. 3 and the flexible frog lure 31, illustrated in FIG. 5. The mixing cylinder 42 is designed to quickly and easily insert in the tail cavity 41 of the flexible shrimp tail 39 and is secured in the tail cavity 41 when the rigid head 36 is threadably inserted in the flexible shrimp tail 39. Accordingly, when it is desired to use the shrimp lure 35, the flexible mixing cylinder 42 can be deformed with the finger 20 and the thumb 21, as illustrated in FIG. 2B with respect to the flexible container 17, to crush the mixing capsule 26 and allow the first component 14 to mix with the second component 15, in order to produce a luminescent mixture 16, as illustrated in FIG. 2C with regard to the rigid body lure 1. The chemical glow can then be viewed through the transparent pattern 11 of selected shape and proportion in the flexible shrimp tail 39.

Figure 7:
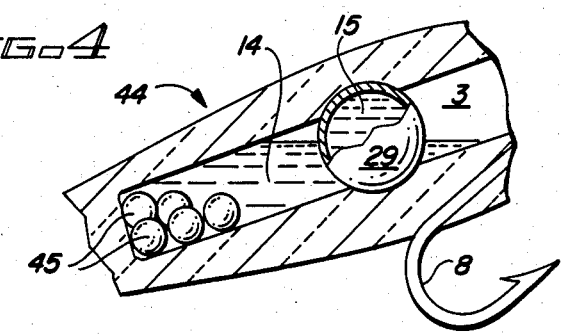
FIG. 7 is a sectional view of a lure body illustrating an alternative combination of the mixing capsule according to the invention.

Referring now to FIG. 7 of the drawing in still another preferred embodiment of the invention, a flexible lure body 44 is provided with a body cavity 3 in the same manner as the rigid body 2 illustrated in FIGS. 1 and 2C. Under these circumstances, a first component 14 is provided in the sealed body cavity 3 as illustrated. Furthermore, a second component compartment 29 is positioned in the body cavity 3 for containing a second component 15 and in a most preferred embodiment, the second component compartment 29 is constructed of a frangible material such as glass, which is easily crushed. In a still further preferred embodiment, multiple balls 45 are included in the body cavity 3 in order to facilitate better mixing of the first component 14 and the second component 15 when the second component compartment 29 is crushed using the finger 20 and the thumb 21, as illustrated with respect to the flexible container 17 in FIG. 2B. The balls 45 serve an additional function, in that after a luminescent mixture 16 is created in the body cavity 3 as illustrated in FIG. 2C of the drawing, the balls 45 impart a rattling effect to the surrounding water as the flexible lure body 44 is retrieved, to further attract fish. It will be appreciated that the balls 45 can also be inserted in the body cavity 3 of the rigid body 2 illustrated in FIGS. 1 and 2C, as desired.

Referring again to FIGS. 1, 2C, and 3-6 of the drawing, it will be appreciated by those skilled in the art that the transparent pattern 11 and the opaque surface 12 can be varied in any configuration to simulate live bait. For example, referring to FIG. 5, the transparent pattern 11 can be shaped to define irregular spots normally found on a small frog in order to entice game fish such as black bass, to strike. Furthermore, referring to FIGS. 3 and 6, the transparent pattern 11 can be configured in the shape of small circles or ellipse to simulate attractive patterns for worms and small snakes. The size of the transparent pattern 11 can also be varied to facilitate more or less chemiluminescent glow and it will be appreciated that the opaque surface 12 can be totally transparent, if desired, to produce maximum chemiluminescent glow to the surrounding water.

The principle advantage of the luminescent fishing lures of this invention lies in the capability of providing a means for quickly and easily introducing a first and second component into either a rigid body lure or a flexible body lure to produce the desired chemiluminescent glow. Furthermore, it will be appreciated by those skilled in the art that the chemiluminescent glow can be characterized by a variety of colors, depending upon the chemicals chosen. Typical chemicals for illuminating lures according to the technique of this invention are disclosed in U.S. Pat. No. 3,918,190, dated Nov. 11, 1975, to Eugene K. Hornbeck. These chemicals are detailed in Examples 1-3 in that patent. Furthermore, referring again to FIGS. 1 and 2A through 2C, in the case of the rigid body lure 1, the use of a flexible container 17 which contains a quantity of first component 14 and a separate activator vial 22 or second component compartment 29 for containing a second component 15, is useful in order to avoid the necessity of carrying two such containers. Accordingly, as illustrated in FIG. 2B, when the flexible container 17 is deformed and the activator vial 22 crushed, a luminescent mixture 16 is produced which can be directly inserted in the body cavity 3 of the rigid body 2, as illustrated in FIG. 2C and as heretofore described. Alternatively, and as also heretofore described, two such containers can be used, one of which contains a first chemiluminescent component and the second containing a second chemiluminescent component and the containers need not be flexible, to introduce both components into the body cavity 3 of the rigid body 2.

It will be understood by those skilled in the art that rigid body fishing baits of all designs, including topwater, underwater, spinner baits and the like, which have hollow heads or body cavities can be caused to glow chemically according to the teaching of this invention. Furthermore, under circumstances where an oxalate compound such as that manufactured by American Cyanamide Company, Polymer Products Division, is used, the oxalate compound can be inserted in the body cavity 3 of a rigid body 2 and the rigid body lure 1 placed in a foil container to preserve the integrity of the oxalate compound until the rigid body lure 1 is to be used. When the rigid body lure 1 is used, an activator is injected in the body cavity 3, either by means of a container such as the flexible container 17, or by means of a conventional syringe fitted with an 18 gauge needle and the access screw 5 is replaced in the access opening 4. When the rigid body lure 1 which is provided with a luminescent mixture 16 is not in use, it can be placed back in the foil package and then on ice, or it can be frozen to reduce the activity of the luminescent mixture 16. The rigid body lure 1 can therefore be used on several occasions with a single charge of luminescent mixture 16, under these circumstances. Similarly, after the mixing capsule 26 s crushed to provide a luminescent mixture 16 in the flexible worm lure 24, the flexible frog lure 31 or the shrimp lure 35, these lures can also be placed on ice and in foil packages to reduce the activity of the luminescent mixture 16 until further use.

It will be further appreciated by those skilled in the art that the size of the mixing capsules 26 used in various flexible body lures such as the flexible worm lure 24, the flexible frog lure 31 and the shrimp lure 35 can be varied, depending upon the size of the lure chosen. In the case of the flexible worm lure 24 and flexible frog lure 31, the mixing capsule 26 is inserted in the worm body 25 and frog body 32 by forcing the mixing capsule 26 through the soft plastic and locating it in a desired position within the flexible worm lure 24 and flexible frog lure 31, respectively. Furthermore, the quantity of the first component 14 and second component 15 which are isolated in the mixing capsule 26 can be further chosen, depending upon the chemicals desired, in order to vary the degree of brightness of chemiluminescent glow produced through the transparent pattern 11 in each case. Similarly, when dealing with the rigid body lure 1, the relative quantities of first component 14 and second component 15 located in the flexible container 17 and in the alternative, introduced separately into the body cavity 3, can be chosen for desired brightness by experimentation.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A luminescent fishing lure for attachment to a fishing line and attracting fish comprising a shaped lure body having a substantially opaque exterior surface and provided with a substantially transparent pattern in at least a portion of said surface; at least one mixing capsule provided in said body, said mixing capsule characterized by a flexible outer capsule and an inner capsule, said inner capsule having at least one first compartment for containing a first chemiluminescent compound, a second compartment for containing a second chemiluminescent compound and at least one frangible membrane separating said first compartment from said second compartment, whereby when said frangible membrane is ruptured, said first chemiluminescent component is mixed with said second chemiluminescent component to form said luminescent material; and eye means secured to said lure body for attaching said lure body to the fishing line.

2. The luminescent fishing lure of claim 1 wherein said at least one first compartment is two end compartments separated by said second compartment and said at least one frangible membrane is two frangible membranes separating said end compartments from said second compartments.

3. A luminescent fishing lure for attachment to a fishing line and attracting fish comprising a shaped, substantially flexible lure body; a substantially opaque surface on the exterior of said lure body; at least one mixing capsule provided in said body, said mixing capsule characterized by a flexible outer capsule and an inner capsule; said inner capsule having at least one first compartment for containing a first chemiluminescent component, a second compartment for containing a second chemiluminescent component and at least one frangible membrane separating said first compartment from said second compartment, whereby when said frangible membrane is ruptured, said first chemiluminescent component is mixed with said second chemiluminescent component to form said luminescent material; a substantially transparent pattern provided on said opaque surface, said pattern provided in visual communication with said flexible outer capsule, whereby a luminescent glow is emitted from said flexible outer capsule through said pattern for attracting fish when said lure is retrieved by the fishing line.

4. The luminescent fishing lure of claim 3 wherein sid at least one first compartment is two end compartments separated by said second compartment and said at least one frangible membrane is two frangible membranes separating said end compartments from said second compartment.

* * * * *